Dec. 18, 1928.
B. H. ALLEN
1,695,628
SERVING DEVICE
Original Filed April 16, 1926  2 Sheets-Sheet 1
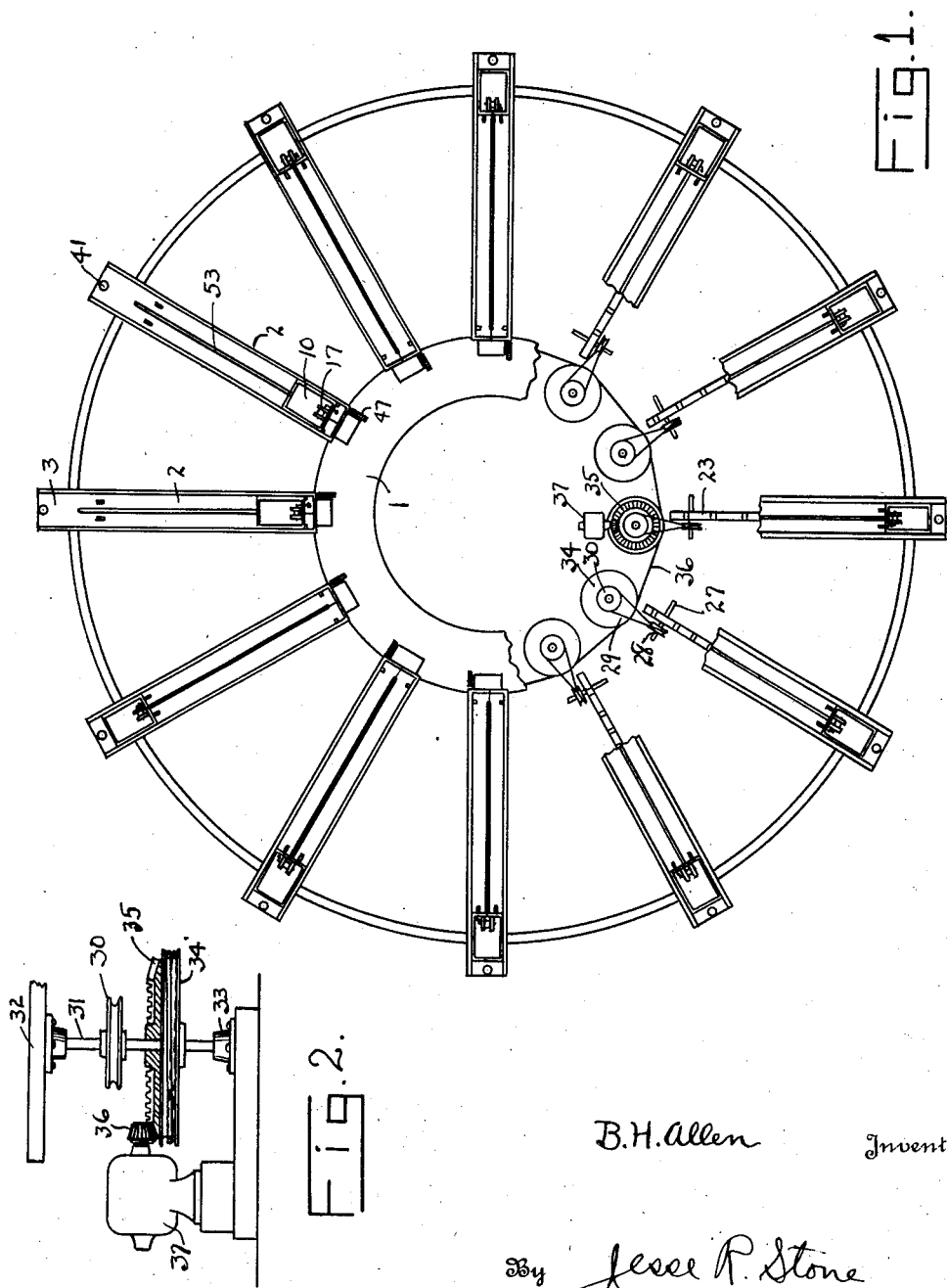
B.H. Allen  Inventor
By Jesse R. Stone
Attorney Dec. 18, 1928.
B. H. ALLEN
1,695,628
SERVING DEVICE
Original Filed April 16, 1926  2 Sheets-Sheet 2
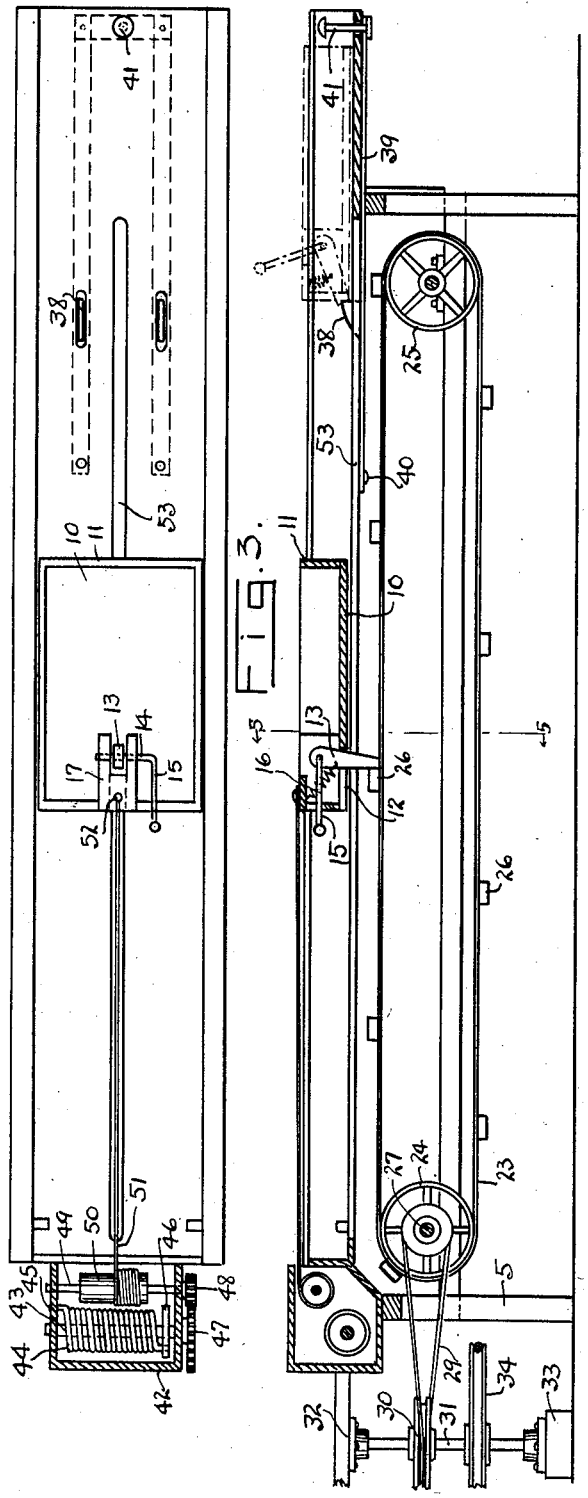
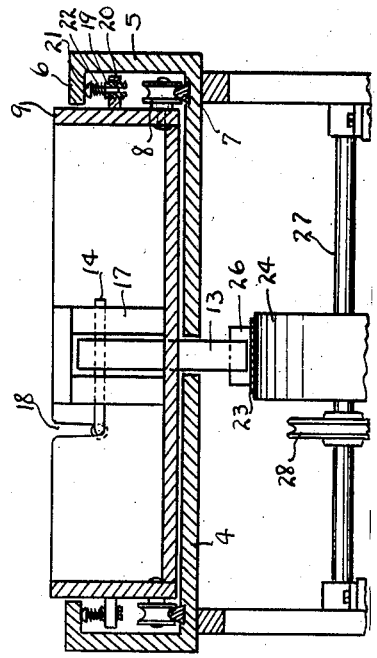
B. H. Allen  Inventor
Jesse R. Stone  Attorney Patented Dec. 18, 1928.

1,695,628

UNITED STATES PATENT OFFICE.

BENJAMIN HAWKINS ALLEN, OF BEAUMONT, TEXAS.

SERVING DEVICE.

Application filed April 16, 1926, Serial No. 102,455. Renewed October 23, 1926.

My invention relates to an apparatus by means of which foods and drinks may be served to the patrons of a food and drink stand. It is especially adapted for serving drinks or foods to the passengers in an automobile, or other vehicle.

In serving foods or drinks, such as ice cream or lemonade or similar articles, to patrons of an outdoor stand, it is common to provide attendants whose duty it is to obtain the order from the occupants of a vehicle and to then get the order filled and carry the tray from the stand to the occupants of the car. This requires a material amount of expense and some confusion in the proper serving of the articles of food or drinks.

It is an object of my invention to provide a central stand from which foods or drinks are to be served and a series of serving devices placed in an approximately radial position from the serving stand and so arranged that the tray may be automatically delivered to those in the car without the services of a special attendant.

It is desired that there be arranged a plurality of stalls into which the cars may drive, and to provide a trackway upon which a tray may be moved into a position closely adjacent the car where the patrons of the stand may receive the food.

It is also an object to provide a power driven means for operating all of the separate dispensing devices from one source of power.

The invention consists in the particular arrangement and construction of the serving devices by means of which the foods or drinks are moved from the stand to the consumer in an automatic manner, and the further objects and advantages of the device will appear more clearly from the description which follows.

Referring to the drawing herewith, Fig. 1 is a plan view in elevation showing a stand equipped with my invention, certain parts being broken away for clearness. Fig. 2 is a broken detail partly in section, illustrating the manner in which the power is applied in operating my device. Fig. 3 is a top plan view partly in section, illustrating one of the slideways in which the service tray is operated. Fig. 4 is a central longitudinal section through the device, illustrated in Fig. 3 and Fig. 5 is a transverse section taken approximately on the plane 5—5 of Fig. 3. Like numerals of reference are employed to designate like parts in all the views.

Fig. 1 illustrates somewhat diagrammatically the general plan upon which my invention is based. I contemplate a central stand 1 from which drinks or foods may be served. This stand is shown as circular in shape, although this shape is not essential, as will be obvious. There are radial supporting tracks 2 extending radially out from the central stand in spaced relation relative to each other so that an automobile may drive into the space between any two of the trackways, it being contemplated that the automobile will stop in a position with the driver's seat closely adjacent the delivering end 3 of the slideway.

The slideways are arranged to receive a serving tray at the inner end thereof and to move the tray to the outer end where the patron may receive the same and remove the contents thereof for consumption.

The construction of the trays and the manner in which they are operated is best shown in Figs. 3 to 5 inclusive. The slideways have a longitudinal base member 4 supported at its forward end upon supporting legs 5 at the outer edge of the stand 1. It extends away from the stand a sufficient distance to space the outer end away from the stand so that the car containing the patrons to be served shall easily approach the outer end of the slideway. There are upwardly extending side walls 5 upon the base member, said side walls having an inwardly extending flange 6 adjacent the upper end. In the base member 4, along each edge thereof, I further place a rounded rod 7 extending the full length of the slideway and furnishing a track upon which rollers 8, mounted upon the side walls 9 of the tray, may roll.

The tray or carrier 10 is preferably rectangular in shape, having an upwardly extending rim 11 completely around the same. It has a slotted opening 12 adjacent the inner end thereof through which slot may project a dog 13. Said dog is connected at its upper end rigidly to a cross pin 14 having a laterally extending crank arm 15 thereon by means of which the pin 14 may be rotated to throw the dog downwardly into the position shown in Fig. 4. A longitudinal slot 53 is provided through the base 4 of the slideway to allow the movement therein of said dog. A tension spring 16 tends to draw the dog upwardly into a horizontal position above the base of the tray. The cross pin 14 of the dog operating member is mounted within two upright blocks 17 adjacent the forward end of the tray. The crank arm 15, when the dog is in position but extending downwardly, will be received within a forward notch or recess 18 in the inner side of the tray. The tray will, if desired, slide upon the bottom of the slideway, but I have shown it mounted upon the rollers 8, previously described. I also provide a brake member on the opposite sides of the tray to slow up the movement of the tray along the slideway. This brake member comprises a pin 19 mounted upon a side bracket 20 on the tray. The pin is slidable relative to the bracket and is forced upwardly so that the head 21 of the bolt will contact with the flange 6 of the slideway by means of a spiral spring 22. The purpose of this brake member will be later described.

In moving the tray from one end of the slideway to the other, I provide a belt 23 mounted upon pulleys 24 and 25 at the inner and outer ends of the supporting frame respectively, said belt having thereon a series of spaced cleats or blocks 26. These blocks extend outwardly away from the belt and are adapted to engage with the lower end of the dog 13 in the manner shown in Fig. 3. The inner pulley 24 is mounted upon a shaft 27 having thereon a smaller grooved pulley 28 which is connected by means of a belt 29 with a similar grooved pulley 30 upon an upright shaft 31. I contemplate mounting an upright shaft 31 between upper and lower supports 32 and 33 respectively at the inner end of each of the slideways. Each of these shafts has a lower pulley 34 of somewhat larger diameter than that of the pulley 30, and the said pulleys 34 are all adapted to be operated by a continuous cable or belt 36 extending around the outer edge of the stand in contact with the said pulleys 34. One of the shafts 31 has the pulley 34' formed with an upper beveled gear 35 thereon, said gear being operatively connected with a smaller gear 36 formed upon the shaft of a motor 37. In this manner, the pulley 35 may be rotated, thus transmitting this motion through the belt 36 with each of the other shafts 31. I contemplate that the operative mechanism thus described will be constantly in motion.

At the outer end of each slideway I provide a pair of spring pressed latches 38, said latches being mounted upon a strip of resilient metal 39, secured at one end 40 to the lower side of the track base 4. The opposite end of the spring members have pins 41 thereon extending upwardly through the bottom of the slideway and having a button upon the upper end thereof whereby the spring member 39 may be depressed. The latch 38 is rounded on its inner side but has an abrupt shoulder on its outer end so as to engage with the tray when it is in its outermost position. It is contemplated that the tray will be at the forward or inner end of the trackway and that the food may be placed upon the tray and then the attendant will depress the handle 15 so that one of the cleats 26 upon the belt 23 will contact with the lower end of the dog 13, thus carrying the tray outwardly along the slideway until the tray is forced past the latch member 38 so that the outer side of the latch will engage with the tray and hold it in position at the end of the slideway. It will be obvious that when the tray has reached its outer position, the cleat 26 which engages the dog will move downwardly around the pulley 25 and release the dog 13, allowing the spring to throw said dog upwardly into inoperative position, as indicated in dotted lines in Fig. 4.

The tray is moved outwardly along the slideway against the tension of a spring motor, indicated at 42. The spring motor comprises a housing having a shaft 43 mounted therein, said shaft having a spiral spring 44 wound around the same, one end of the spring being attached at 45 to the housing and the other end being secured to a disc 46, secured rigidly upon the shaft 43. It will be obvious that the spring tends to wind up when it has been unwound by some external force. The shaft 43 has a gear 47 at one end, meshing with a gear 48 upon a parallel shaft 49, the gear 48 being of smaller diameter than the gear 47. Upon the shaft 49 is a roller 50 to which is secured a cable 51, the other end of said cable being secured at 52 to the inner end of the serving tray.

Thus, when the tray is carried outwardly along the slideway by the engagement of the dog 13 with the cleat 26, it will be moved against the tension of the spring motor and this tension will assist in holding the cleat and dog frictionally together so that they may not become disengaged until the pulley 25 has been passed. When the tray is latched in position at the outer end of the slideway, the spring motor will tend to hold the tray tightly against the latch 38.

When the occupants of the car drive up to the stand, the tray with a menu thereon may be placed on the tray and the tray moved to the outer end of the slideway by the act of depressing the handle 15 to engage the dog 13 in the manner previously described. The patron may place his order upon the tray and depress the pin 31 and the latch 38, thus releasing the tray so that the spring motor may carry the tray back again to the stand. As the dog 13 is then in inoperative position, the movement of the tray will not be interfered with. The brake members 19 will tend to slow down the movement of the tray so that it will not be drawn back too quickly. The attendant will fill the order placing the required articles upon the tray and again send the tray out to the patron in the same manner as has been previously set forth.

While I have shown one particular embodiment of my invention, it is to be understood that I do not wish to be limited to the exact construction of the parts. The slideway and the means whereby the trays may be moved and supported may be varied in many ways without departing from the spirit of the invention.

What I claim as new and desire to protect by Letters Patent is:

1. In an apparatus of the character described, a central service stand, a plurality of slideways radiating from said stand, service trays on said slideways, means to move said trays from said stand to the outer end of said slideways and separate means to return said trays to said stand.

2. In an apparatus of the character described, a central service stand, a plurality of slideways radiating from said stand, service trays on said slideways, means to move said trays from said stand to the outer ends of said slideways, manually releasable means to latch said trays at the outer end of said slideways, and separate means to return said trays to said stand.

3. In an apparatus of the character described, a central service stand, a plurality of slideways, radiating from said stand, service trays on said slideways, means to move said trays from said stand to the outer ends of said slideways, said means including a constantly moving flexible member beneath said slideway, means on said trays to engage said members, and separate means to return said trays to said stand.

4. In an apparatus of the character described, a central service stand, a plurality of slideways radiating from said stand, service trays on said slideways, means to move said trays from said stand to the outer ends of said slideways, said means including a constantly moving flexible member beneath said slideways, means on said trays to engage said members, said engaging means being held normally away from said members, and separate means to return said trays to said stand.

5. In an apparatus of the character described, a central service stand, slideways radiating therefrom, service trays on said slideways, a moving member below each of said slideways, a dog on said tray adapted to be manually depressed to engage said member whereby said tray may be moved to the other end of said slidway, a latch to retain said tray at said other end of said slideway, and resilient means exerting a pull on said tray to return it to its original position when said latch is released.

6. In an apparatus of the character described, a central service stand, slideways radiating therefrom, service trays on said slideways, a moving member below each of said slideways, a dog on said tray adapted to be manually depressed to engage said member whereby said tray may be moved to the other end of said slideway, a latch to retain said tray at said other end of said slideway, and means to return said tray when said tray is released.

7. In an apparatus of the character described, a central service stand, slideways radiating therefrom, service trays on said slideways, a moving member below each of said slideways, a dog on said tray adapted to be manually depressed to engage said member whereby said tray may be moved to the other end of said slideway, a latch to retain said tray at said other end of said slideway, resilient means exerting a pull on said tray to return it to its original position when said latch is released, and means to exert a braking action upon said tray to resist its rapid movement along said slideway.

8. In an apparatus of the character described, a service stand, supporting slideways connected therewith, trays on said slideways, means to move said trays from said stand to the outer ends of said slideways, means to return said trays to said stand, and means to hold said trays releasably at either end of said slideways.

9. In an apparatus of the character described, a service stand, supporting slideways connected therewith, trays on said slideways, means to move said trays from said stand to the outer ends of said slideways, means to return said trays to said stand, said returning means comprising a spring motor acting to exert a constant pull upon said tray.

10. In an apparatus of the character described, a service stand, serving trays, means for supporting said trays, said supporting means consisting of a structure extending outwardly from said service stand to a desired distance, means for moving said trays to the outer end of said supporting means, and means for returning said trays directly back along said supporting means to said service stand by the reverse movement upon said trays.

In testimony whereof I hereunto affix my signature this 9th day of April A. D. 1926.

BENJAMIN HAWKINS ALLEN.